(12) United States Patent
Zhou

(10) Patent No.: US 10,838,511 B2
(45) Date of Patent: Nov. 17, 2020

(54) KVM EXTENDER RECEIVING END PROVIDED WITH SWITCHING DEVICE FOR COMMUNICATING WITH VIRTUAL TERMINALS

(71) Applicant: Ligang Zhou, Huai'an (CN)

(72) Inventor: Ligang Zhou, Huai'an (CN)

(*) Notice: Subject to any disclaimer, the term of this patent is extended or adjusted under 35 U.S.C. 154(b) by 124 days.

(21) Appl. No.: 15/835,394

(22) Filed: Dec. 7, 2017

(65) Prior Publication Data

US 2018/0101241 A1 Apr. 12, 2018

Related U.S. Application Data

(63) Continuation of application No. PCT/CN2016/000297, filed on Jun. 7, 2016.

(30) Foreign Application Priority Data

Jun. 8, 2015 (CN) .......................... 2015 1 0308671
Jul. 2, 2015 (CN) .................... 2015 2 0475187 U
Aug. 19, 2015 (CN) .......................... 2015 1 0510686
Sep. 7, 2015 (CN) .......................... 2015 1 0562768

(51) Int. Cl.
 *G06F 3/023* (2006.01)
 *G09G 5/00* (2006.01)
 *G06F 3/02* (2006.01)
 *G06F 3/0354* (2013.01)

(52) U.S. Cl.
 CPC ............ *G06F 3/023* (2013.01); *G06F 3/0227* (2013.01); *G06F 3/03543* (2013.01); *G09G 5/003* (2013.01); *G09G 2358/00* (2013.01); *G09G 2370/02* (2013.01); *G09G 2370/027* (2013.01); *G09G 2370/24* (2013.01)

(58) Field of Classification Search
 CPC ....................................................... G06F 3/023
 See application file for complete search history.

(56) References Cited

U.S. PATENT DOCUMENTS

| | | | | |
|---|---|---|---|---|
| 5,721,842 A * | 2/1998 | Beasley | ................... | G06F 3/023 709/204 |
| 8,558,795 B2 * | 10/2013 | Hoerl | ...................... | H04L 41/04 345/168 |
| 8,671,235 B2 * | 3/2014 | Tung | .................... | G06F 3/0489 710/62 |
| 8,825,931 B2 * | 9/2014 | French | ................... | G06F 3/038 710/73 |

(Continued)

FOREIGN PATENT DOCUMENTS

| CN | 103399649 | * 11/2013 | ............. G06F 3/023 |
|---|---|---|---|
| WO | 2020125705 A | 6/2020 | |

*Primary Examiner* — Tammara R Peyton
(74) *Attorney, Agent, or Firm* — Wayne & Ken, LLC; Tony Hom

(57) ABSTRACT

The invention is KVM extender receiving end provided with switch device. It includes video decoder, mouse and keyboard encoder and switch device, the input end of video decoder is connected to switch device. The output end of mouse and keyboard encoder is connected to switch device. Advantages: it will separate the intranet and the internet of the department. It will not only prevent hacker's attack but also effectively prevent internal staff from network leak. It can place two computers into the computer room, which is far away from personal office station and save a lot of office space for each office worker.

1 Claim, 7 Drawing Sheets

Figure 1:
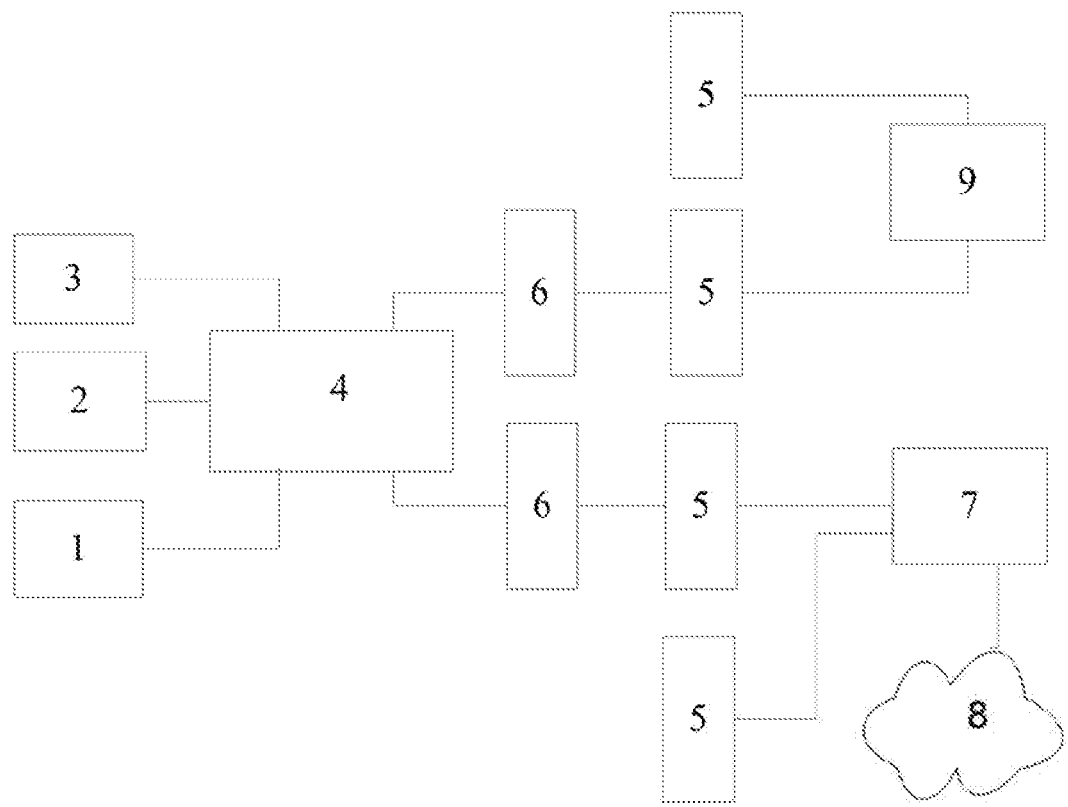
Figure 2:
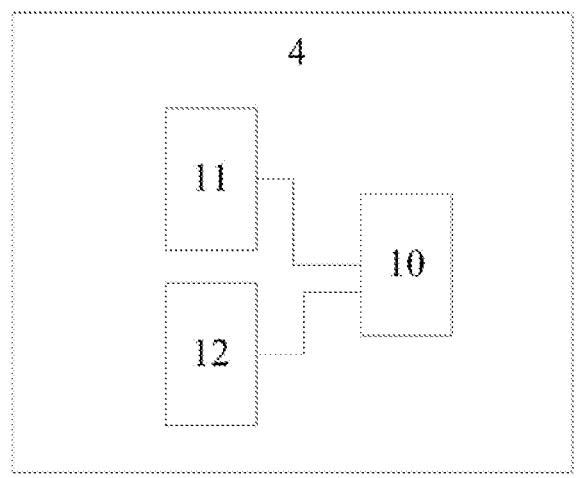
Figure 3:
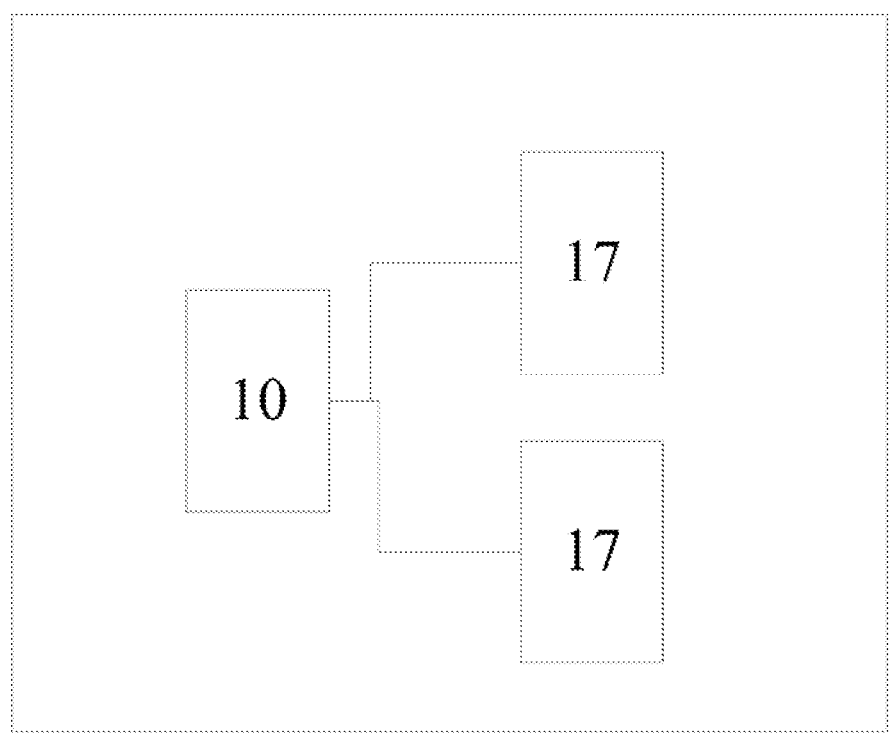
Figure 4:
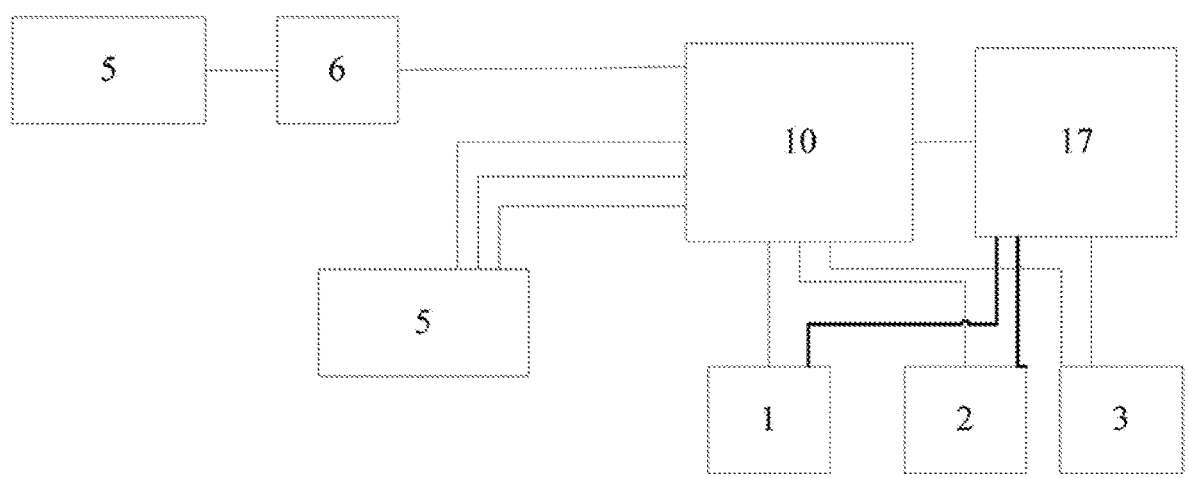
Figure 5:
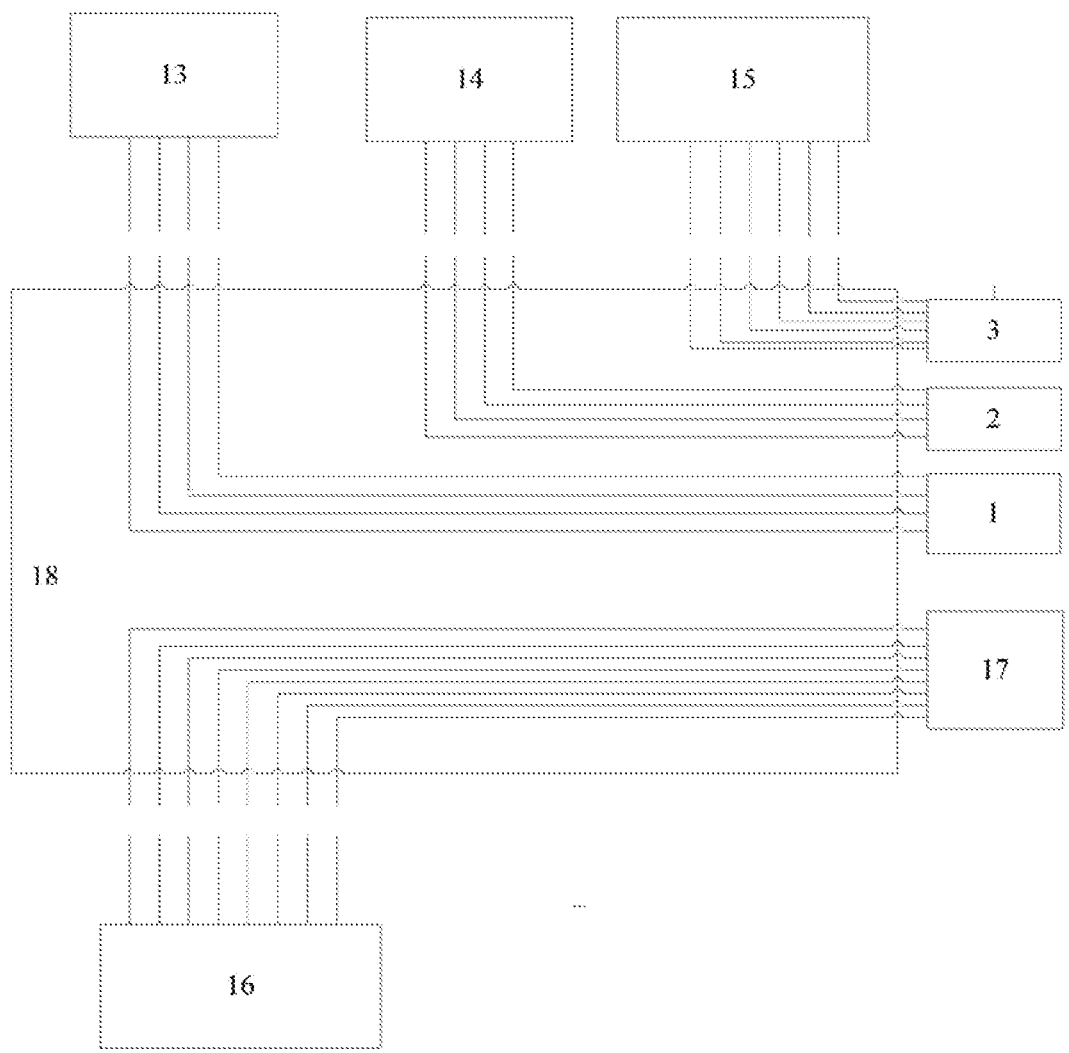
Figure 6:
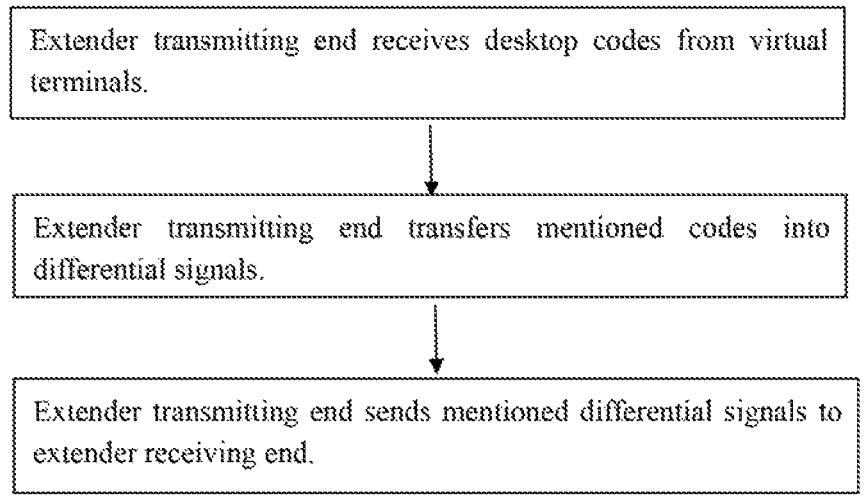

```
Extender transmitting end receives desktop codes from virtual terminals.
                      ↓
Extender transmitting end transfers mentioned codes into differential signals.
                      ↓
Extender transmitting end sends mentioned differential signals to extender receiving end.
```

(56) References Cited

U.S. PATENT DOCUMENTS

| | | | |
|---|---|---|---|
| 9,129,123 B2* | 9/2015 | Mooring | G06F 9/45545 |
| 9,423,884 B2* | 8/2016 | Yasuno | G06F 3/023 |
| 2006/0064509 A1* | 3/2006 | Chen | H04W 4/50 |
| | | | 709/250 |
| 2009/0210608 A1* | 8/2009 | Chang | G06F 13/4022 |
| | | | 710/316 |
| 2011/0063211 A1* | 3/2011 | Hoerl | H04L 43/00 |
| | | | 345/157 |

* cited by examiner

```
┌─────────────────────────────────────────────────────────────────────┐
│ Computer and control and measure device appoints a certain set of   │
│ data transmission format and communication port number. The socket  │
│ communication port used when computer sends data to KVM extender    │
│ transmitting end is 4888. The socket communication port used when   │
│ KVM extender transmitting end sends data to computer is 4889.       │
└─────────────────────────────────────────────────────────────────────┘
                                  ↓
┌─────────────────────────────────────────────────────────────────────┐
│ Set an IP address 192.186.1.1 for the computer and start a program  │
│ on the computer, and then create a virtual terminal X.              │
└─────────────────────────────────────────────────────────────────────┘
                                  ↓
┌─────────────────────────────────────────────────────────────────────┐
│ The standard Android operation system used by KVM extender          │
│ transmitting end includes TCP/IP Protocol. Set up an IP address     │
│ 192.168.1.30 for communication port B.                              │
└─────────────────────────────────────────────────────────────────────┘
                                  ↓
┌─────────────────────────────────────────────────────────────────────┐
│ The computer constantly sends interface coding from virtual         │
│ terminal X to communication port B. After communication port B with │
│ MAC address receives image information, it sends the information to │
│ the extender transmitting end C that is directly connected to it.   │
└─────────────────────────────────────────────────────────────────────┘
                                  ↓
┌─────────────────────────────────────────────────────────────────────┐
│ KVM extender transmitting end C starts a software Y. Software Y     │
│ will decode the data package it has received based on a certain set │
│ of data transmission format appointed by computer and control and   │
│ measure device. The it will get codes at virtual terminal X.        │
│ Software Y sends the codes at virtual terminal X to the video       │
│ encoder of KVM extender transmitting end C.                         │
└─────────────────────────────────────────────────────────────────────┘
                                  ↓
┌─────────────────────────────────────────────────────────────────────┐
│ The video encoder KVM extender transmitting end C programs the      │
│ interface coding it has received into differential signals, and     │
│ then sends the signals to extender receiving end D.                 │
└─────────────────────────────────────────────────────────────────────┘
                                  ↓
┌─────────────────────────────────────────────────────────────────────┐
│ After KVM extender receiving end D receives the signals, it will    │
│ decode the image information and sends the signals to display       │
│ device. After users see the image displayed on the screen, the      │
│ users use mouse and keyboard for further operation.                 │
└─────────────────────────────────────────────────────────────────────┘
                                  ↓
┌─────────────────────────────────────────────────────────────────────┐
│ The mouse and keyboard encoder at the KVM extender receiving end D  │
│ instantly encodes the mouse and keyboard signal and sends out the   │
│ signals.                                                            │
└─────────────────────────────────────────────────────────────────────┘
                                  ↓
┌─────────────────────────────────────────────────────────────────────┐
│ The mouse and keyboard signal decoder of KVM extender transmitting  │
│ end C decodes the signal right after it receives the mouse and      │
│ keyboard signal and transfers it into mouse and keyboard signal.    │
│ Software Y will read the signal and put a data package into the     │
│ signal. The data package will be sent to the computer through       │
│ communication port B with MAC address.                              │
└─────────────────────────────────────────────────────────────────────┘
                                  ↓
┌─────────────────────────────────────────────────────────────────────┐
│ Virtual terminal X decodes the data package and it will get mouse   │
│ and keyboard signal. Limited mouse and keyboard signal will only    │
│ impact virtual terminal X. Virtual terminal X will process related  │
│ operations after it receives mouse and keyboard signal. If related  │
│ operation causes any changes to the screen, user can notice it from │
│ the screen instantly.                                               │
└─────────────────────────────────────────────────────────────────────┘
```

Fig.7

KVM EXTENDER RECEIVING END PROVIDED WITH SWITCHING DEVICE FOR COMMUNICATING WITH VIRTUAL TERMINALS

TECHNICAL FIELD

The invention involves KVM extender receiving end provided with switching device, which belongs to electric equipment technology field.

BACKGROUND TECHNOLOGY

Nowadays an important departments are installed with two sets of computer network. One is internal network, which is internal office network. The other is external network, which connects with internet. These two methods have brought great convenience to people's life and information security has been greatly improved. But there are also shortages. Internal shaft can disclose information through crossover network cable and cause immeasurable losses to the department. And two computer mainframes are placed under the office desks, which takes up valuable personal work space and cause great trouble to daily jobs.

INVENTION CONTENT

As the extender transmitting end and extender receiving end adopt differential transmission technology, we take advantage of this feature to solve the information security issues for users.

Firstly, the invention provided a KVM extender receiving end provided with switching device. It includes video decoder, mouse and keyboard encoder and switch device, the connection between input end of video decoder and switch device and the connection between the output end of mouse and keyboard encoder and switch device.

Secondly, the invention provides a computer motherboard. It includes KVM extender transmitting end, the connection between the video signal input end of KVM extender transmitting end and the video output end of mentioned computer motherboard as well as the connection between the mouse and keyboard signal output end of KVM extender transmitting end and the mouse and keyboard input end of mentioned computer motherboard.

Thirdly, the invention provides a computer. It includes KVM extender receiving end, the connection between the mouse and keyboard signal input end of KVM extender receiving end and the mouse and keyboard output end of mentioned computer motherboard as well as the connection between the video signal output end of KVM extender receiving end and the display device of mentioned computer motherboard.

Fourthly, the invention provides a computer system. It includes motherboard, at least one plug-in type of KVM extender transmitting end. The plug-in type of KVM extender transmitting end includes video signal output end and mouse and keyboard input receiving end, which will be plugged in the mentioned motherboard.

Fifthly, the invention provides working method for KVM extender transmitting end. It includes:

KVM extender transmitting end receives desktop codes from (of) virtual terminals;

The mentioned KVM extender transmitting end transfers the mentioned desktop codes into differential signals with equal length and width.

The mentioned KVM extender transmitting end sends the mentioned differential signals with equal length and width to KVM extender receiving end.

Sixthly, the invention provides a KVM extender transmitting end, which features that the input end of a single KVM extender transmitting end relates to a communication port with MAC address.

Seventhly, the invention provides a method in which the communication port with MAC address transmits to virtual terminals. The mentioned KVM extender transmitting end receives the desktop codes of virtual terminals. It includes that the mentioned KVM extender transmitting end receives the desktop codes of virtual terminals from its corresponding communication port with MAC address.

The technical solution for the invention includes video decoder, mouse and keyboard encoder and switch device, the connection between input end of video decoder and switch device and the connection between the output end of mouse and keyboard encoder and switch device.

The advantage of the invention is that it completely separates the intranet of the department from the internet. It will not only prevent hacker's attack, but also effectively prevents internal staff from network leak. And it can place two computer mainframes in the computer room, which is far away from personal office location. It saves a lot of office space for office workers.

ILLUSTRATION FOR ATTACHED PICTURES

Picture 1 is the network structure described in the implementation method 1 of the invention.

Picture 2 is the structure described in the implementation method 1 of the invention.

Picture 3 is the structure described in the implementation method 2 of the invention.

Picture 4 is the network structure described in the implementation method 3 of the invention.

Picture 5 is the structure described in the implementation method 3 of the invention.

Picture 6 is a method.

Picture 7 is a method.

1 in the picture is mouse, 2 is keyboard, 3 is display device, 4 is KVM extender receiving end provided with switch device, 5 is computer, 6 is KVM extender transmitting end, 7 is router, 8 is Internet, 9 is switch, 10 is switch device, 11 is video decoder, 12 is mouse and keyboard encoder, 13 is mouse input end of the computer, 14 is keyboard input end of the computer, 15 is video output end of the computer, 16 is extender connection port, 17 is regular KVM extender receiving end, 18 is switch button, 19 is communication port with MAC address.

IMPLEMENTATION METHOD

According to picture 2, KVM extender receiving end provided with switch device 4 consists of switch device 10, video decoder 11 and mouse and keyboard encoder 12, among which the first signal input/output end of switch device 10 is connected to the first signal input/output end of video decoder 11, the second signal input/output end of switch device 10 is connected to KVM extender transmitting end 6, the second signal input/output end of video decoder 11 is connected to display device, the second signal input/output end of mouse and keyboard encoder 12 is connected to mouse, the third signal input/output end of mouse and keyboard encoder 12 is connected to keyboard.

Switch device 10: after two extension cables are connected to switch device 10, switch device 10 can realize manual switch or automatic switch by mouse and keyboard and connect extension cables with video decoder 11, Meanwhile, only one extension cable can be connected to video decoder 11, extension cable can be twisted-pair cable or HDMI cable, in which twisted-pair cable is regular one. Two extension cables are connected to switch device 10. Manual switch mode refers to the manual button that is operated by man in the switch device 10. The video decoder can be connected to specific KV extender transmitting end 6 through extension cables.

The cable that connects KVM extender transmitting end with KVM extender receiving end is called extension cables. The extension cable that is commonly used is twisted-pair cable. There are four pairs of cables in each twisted-pair cable, in which three pairs of cables connect output end of video decoder to input end of switch device and one pair of cables connect input end of mouse and keyboard encoder to output end of switch device. The output end of switch device is connected to display device by a video cable. The input end of switch device is connected to mouse and keyboard by two connection cables separately. Meanwhile, display device, mouse and keyboards can only be connected to a set of video decoder and mouse and keyboard encoder through switch device.

The device that switches two extension cables is called extension cable switch device. The switch device can be divided based on extension cable, like twisted-pair cable switch device, HDMI switch device.

Take twisted-pair cable for example, the switch principle for switch device is as below:

1. Two twisted-pair cables are both connected to switch device.

2. Meanwhile, switch device only connect one twisted-pair cable to other devices.

Video decoder 11: If corresponded with video encoder of KVM extender transmitting end 6, it will encode the signals sent out from KVM extender transmitting end 6. Video decoder 11 receives the video signals sent out from KVM extender transmitting end 6 and then sends to display device for display after decoding.

Mouse and keyboard encoder 12: it is connected to mouse and keyboard, and then it encodes and sends out the signal from mouse and keyboard. The common transmission method between mouse and keyboard encoders are RS-485 communication chain road.

KVM extender transmitting end 6: There is one video signal encoder and one mouse and keyboard decoder.

The function of video signal encoder is to transfer video signal into differential signal, then realize long-distance transmission by twisted-pair cable. We usually use twisted-pair cable as extension cable. There are eight data cables for each twisted-pair cable, among which six cables are used for video signal transmission and another two cables are used for muse and keyboard signal transmission. Transmission agent can also be HDMI cable. If this kind of agent is used, the encoder and decoder at both ends will become corresponding encoder and decoder. Now encoder can transfer signal into other formats. If data is transmitted, video decoder will decode correspondingly.

The function of mouse and keyboard decoder is to receive mouse and keyboard signals sent out from mouse and keyboard encoder, and then decode these signals and send to computer mainframe.

Mouse and keyboard decoder will decode the signals sent out from mouse and keyboard encoder and send to computer.

The connection method between switch device and KVM extender transmitting end can be wired or wireless.

KVM extender transmitting end can be integrated into computer. Details are as below:

The video signal, input end of KVM extender transmitting end is connected to the video output end of motherboard. The mouse and keyboard signal output end of KVM extender transmitting end is connected to mouse and keyboard input end. The video encoder of KVM extender transmitting end encodes the signals input by mentioned video signal input end. The mouse and keyboard decoder of KVM extender transmitting end decodes the signal input by mouse and keyboard signal input end of KVM extender transmitting end.

KVM extender receiving end can be integrated into computer. Details are as below:

The video signal output end of KVM extender receiving end is connected to the input end of display device. The mouse and keyboard signal input end of KVM extender receiving end is connected to mouse and keyboard output end. The video decoder of KVM extender receiving end decodes the signals input by mentioned video signal input end. The mouse and keyboard encoder of KVM extender receiving end encodes the signal input by mouse and keyboard signal input end of KVM extender receiving end.

There are many implementation methods for the invention. Specific details are as below:

Implementation Method 1:

According to picture 1 attached, both ends of KVM extender receiving end provided with switch device are separately connected to KVM extender transmitting end by extension cables. The other end against each KVM extender transmitting end is connected to mouse port, keyboard port, display device port of a computer. The mainframe of each computer is connected to different intranets. It is applicable to below business models: the department has two sets of networks. One is internal network, the other is external network. And end user can select one network by switch device.

Work Procedure:

1. The mainframes of two distant computers are separately connected to one KVM extender transmitting end 6. The connection method is to connect video output port of the computer to the video input port of KVM extender transmitting end 6. The mouse input port of the computer is connected to the mouse output end of KVM extender transmitting end 6. The keyboard input port of the computer is connected to the keyboard output end of KVM extender transmitting end 6.

2. Use twisted-pair cables to connect distant KVM extender receiving end provided with switch device and KVM extender transmitting end 6.

3. The part switch device 10 of KVM extender receiving end provided with switch device connects different extension cables to video decoder 11 based on demand.

4. After video decoder 11 decodes the video signals it has received and distributes the signals on the display device 3 that is connected to it.

5. After mouse and keyboard encoder 12 transfers the signal from mouse 1 and keyboard 2, it will send the signals to its corresponding KVM extender transmitting end 6. After KVM extender transmitting end 6 decodes the signals, it will send the signals to its corresponding computer.

Implementation Method 2:

According to picture 3 attached, switch device has one mouse and keyboard display switch device and two KVM extender receiving ends. Each KVM extender receiving end is connected to switch device through mouse connection cable, keyboard connection cable and video cable.

It is applicable to below business model: Two KVM extender receiving receives video signal and decode video signal separately, and then they send the signal to switch device. End user can display the video signal from different KVM extender receiving end based on his demand. Meanwhile, display device can only display the video signal from one KVM extender receiving end and send mouse and keyboard signal to the computer.

Work Procedure:

1. One end of switch device is connected to display device, mouse and keyboard. Another two ends are separately connected to KVM extender transmitting end through extension cables. The other end of each KVM extender transmitting end is connected to one computer. The connection method is to connect the mouse, keyboard and display device of the computer through connection cables. Each computer mainframe connects different intranets.

2. Two remote computer mainframes are separately connected to one KVM extender transmitting end 6. The connection method is to connect the video output port of the computer to the video input port of KVM extender transmitting end 6, to connect the mouse input port of the computer to the mouse output port of KVM extender transmitting end 6, to connect the keyboard input port of the computer to the keyboard output port of KVM extender transmitting end 6.

3. Remote KVM extender receiving end is connected to KVM extender transmitting end 6 through twisted-pair cable.

4. Two decoders in the switch device are separately connected to extension cables, and then process decoding separately. It will send the signal to switch device 10;

5. Switch device 10 manually or automatically send the video signal to display device and the mouse and keyboard signal to the computer.

Implementation Method 3:

It includes one KVM extender receiving end and a switch device. There are three output ports on the switch device: first output port, second output port and third output port. The first output port is the first connection plug, which is used for the first extension cable. The extension cable is the cable that connects KVM extender transmitting end to KVM extender receiving end. The second output port is mouse and keyboard output port and video input port, which is used to connect to mouse and keyboard input port and video output port of the computer. The third input and output port is mouse and keyboard input port and video output port, which is used to connect to mouse, keyboard and display device. The switch device is used to connect the first extension cable to video decoder and to connect the first extension cable to mouse and keyboard encoder, or to connect the mouse and keyboard input port of the computer to mouse and keyboard and to connect mentioned video output part to display device.

Picture 4 attached is the network structure of this implementation method.

It is applicable to below business model: The company has already had one intranet, and for information security, it sets up another set of network system.

User's Work Procedure:

Picture 5 attached is the structure of a switch device. There are four connection cables for each mouse and keyboard of the computer. Two cables are power cords and another two cables are data cables. Normally there are 5 pins in the VGA signal line interface. In general, 6 cables can be used to achieve normal display. These 6 cables are red, green, blue, HSYNC, VSYNC and ground wire. There are 8 connection cables in the connection port of extension cable.

1. Switch button is pushed to mouse input port, keyboard input port and display device output port. And mouse, keyboard and display device are connected to computer mainframe and then local computer can be operated.

2. Switch button is pushed to mouse input port extension connection port. And then mouse and keyboard is connected to mouse encoder, display device is connected to video decoder. Then, user can operate the computer in the computer room.

Implementation Method 4:

Separate switch device from KVM extender receiving end and construct the network shown in the picture 1 attached. KVM extender receiving end includes video decoder and mouse and keyboard encoder.

Implementation method 5: a Work Procedure for KVM Extender Transmitting End

According to picture 6 attached:

1. KVM extender transmitting end receives desktop codes from virtual terminals.

2. KVM extender transmitting end transfers mentioned codes into differential signals.

3. KVM extender transmitting end sends mentioned differential signals to extender receiving end.

The mentioned differential signal is the differential signal that is suitable for differential transmission.

Specific procedures are:

KVM extender transmitting end is made into a card, which includes video encoder, mouse and keyboard decoder and pins. The pins are used to plug KVM extender transmitting end in the computer motherboard. It is directly plugged in the computer. There is one port for the card, which is used to output video signal and to receive mouse and keyboard signal through twisted-pair cables. Each computer has one or more cards.

Advantages: KVM extender transmitting end is used to send out virtual terminal. As the video encoder of KVM extender transmitting end and the video decoder of KVM extender transmitting end transmits video signal instead of data files, users cannot copy data from computer motherboard to KVM extender receiving end, so that data security is effectively guaranteed.

Virtual terminal X is any one of below virtual terminals.

① Multi-split virtual terminal. Many users can use one same PC independently at the same time. Each user has his or her own display device, keyboard and mouse. Users can share hardware, software or external sources of one same PC at the same time.

Multi-split virtual terminal includes multi-split virtual terminal Q and multi-split virtual terminal W.

Multi-split virtual terminal Q: Set up one user in one PC or set up one user when operating one software and allocate an original desktop for the user. Send the user's desktop to the video encoder of KVM extender transmitting end A. The mouse and keyboard signal on the user's desktop is from the mouse and keyboard decoder of KVM extender transmitting end.

Multi-split virtual terminal W: Set up, one window P in one PC. And window P is plugged with one or more application programs. Send the content of window P or the content that window P displays to the video encoder of KVM extender transmitting end A. The mouse and keyboard signal in the window P is from KVM extender transmitting end A. The desktop of multi-split virtual terminal W is the content displayed by the window P or in the window P.

② the client on the cloud server. Create a user on the server and allocate one operation system to the user. After the user is allocated with processor, memory and hardware, we will regard the user as the client of one cloud server. The mentioned server is cloud server. The mouse and keyboard signal for the client of cloud server is from the mouse and keyboard decoder of KVM extender transmitting end.

Hardware Design:

1. KVM extender transmitting end is made into a card. There is one port on the card, which is used to output video signal and to receive mouse and keyboard signal through twisted-pair cables.

2. The card is plugged in the computer.

3. The driver of the card is then started.

Software Design:

1. Create a virtual terminal X on the computer.

2. Regard the desktop of virtual terminal X as a source for video. The processer of the computer constantly sends the desktop of virtual terminal X to the video encoder of KVM extender transmitting end A.

3. The video encoder of KVM extender transmitting end A encodes the signal has received and then sends out the signal.

4. The video decoder of KVM extender receiving end B decodes the signal it has received and then sends the signal to display device. The display device will display images.

5. After user see the images displayed on the screen, they will use mouse and keyboard for further operation.

6. The mouse and keyboard encoder of KVM extender receiving end B encodes the signal it has received and then sends the signal out.

7. The mouse and keyboard decoder of KVM extender transmitting end A decodes the signal sent out from the mouse and keyboard encoder of KVM extender receiving end B and sends the signal to virtual terminal X. Limited mouse and keyboard input signal can only impact virtual terminal X.

8. Virtual terminal X will process related operations after it receives mouse and keyboard signal. If related operation causes any changes to the screen, user can notice it from the desktop of virtual terminal X instantly.

Implementation Method 6: Communication Port with MAC Address Transfers to Virtual Terminal.

Each KVM extender transmitting end is connected to one communication port with MAC address. There are two connection methods for communication port with MAC address to connect to switchboard. One is that communication port is connected to one pert of the switchboard. The other one is that communication port is connected to the switch chip of the switchboard.

Communication port with MAC address can send the desktop of a virtual terminal to the KVM extender transmitting end that is directly connected to communication port with MAC address.

Advantages: KVM extender transmitting end is used to send out virtual terminal, then user can process normal operation on the virtual terminal. As the video encoder of KVM extender transmitting end and the video decoder of KVM extender transmitting end transmits video signal instead of data files, users cannot copy data from computer motherboard to KVM extender receiving end, so that data security is effectively guaranteed.

Virtual terminal X is any one of below virtual terminals.

① Multi-split virtual terminal. Many users can use one same PC independently at the same time. Each user has his or her own display device, keyboard and mouse. Users can share hardware, software or external sources of one same PC at the same time including multi-split virtual terminal Q and multi-split virtual terminal W.

Multi-split virtual terminal Q: Set up one user in one PC or set up, one user when operating one software R and allocate an original desktop for the user. Send the user's desktop to software M. The mouse and keyboard signal on the user's desktop is from software M.

Multi-split virtual terminal W: Operate software R and set up a window P in one PC. And window P is plugged with one or more application programs. Send the content of window P or the content that window P displays to software M. The mouse and keyboard signal in the window P is from software M.

The desktop of multi-split virtual terminal W is the content that is display by the window P or in the window P.

② the client on the cloud server. Operate software R and create a user on the server and allocate one operation system to the user. After the user is allocated with processor, memory and hardware, we will regard the user as the client of one cloud server. The mentioned server is cloud server. The mouse and keyboard signal for the client of cloud server is from software M.

Software M is a program on the computer. It can be regarded as the sub-program of software R. KVM extender transmitting end receives desktop codes of the virtual terminal sent out from its corresponding communication port with MAC address.

Specific Procedure:

Hardware Design:

1. The computer is connected to switchboard A through wire cables.

2. The first input and output port of communication port with MAC address is connected to KVM extender transmitting end. The second input and output port of communication port is connected to one port of the switchboard or the switch chip of the switchboard.

3. The video encoder and mouse and keyboard decoder of KVM extender transmitting end share a set of processors.

4. Memory and motherboard. The mentioned processor, memory and motherboard can support Android operation system.

Software Design

According to picture 7 attached:

1. Computer and control and measure device appoints a certain set of data transmission format and communication port number. The socket communication port used when computer sends data to KVM extender transmitting end is 4888. The socket communication port used when KVM extender transmitting end sends data to computer is 4889.

2. Set an IP address 192.186.1.1 for the computer.

3. The standard Android operation system used by KVM extender transmitting end includes TCP/IP Protocol. Set up an IP address 192.168130 for communication port B.

4. Create virtual terminal X and operate software M on the computer. Software M regards the desktop of virtual terminal X as a source for video and constantly sends the desktop of virtual terminal X to communication port B.

5. Communication port B sends out the signal that it has received to KVM extender transmitting end.

6. KVM extender transmitting end C starts a software Y, Software Y will decode the data package it has received based on a certain set of data transmission format appointed by computer and control and measure device. The it will get codes at virtual terminal X. Software Y sends the codes at virtual terminal X to the video encoder of KVM extender transmitting end C.

7. The video encoder KVM extender transmitting end C programs the interface coding it has received into differential signals, and then sends the signals to extender receiving end D.

8. After KVM extender receiving end D receives the signals, it will decode the image information and sends the signals to display device.

9. After users see the image displayed on the screen, the users use mouse and keyboard for further operation.

10. The mouse and keyboard encoder at the KVM extender receiving end D instantly encodes the mouse and keyboard signal and sends out the signals.

11. The mouse and keyboard signal decoder of KVM extender transmitting end C decodes the signal right after it receives the mouse and keyboard signal and transfers it into mouse and keyboard signal. Software Y will read the signal and put a data package into the signal. The data package will be sent to the computer through communication port B with MAC address.

12. Virtual terminal X decodes the data package and it will get mouse and keyboard signal. Limited mouse and keyboard signal will only impact virtual terminal X. Virtual terminal X will process related operations after it receives mouse and keyboard signal. If related operation causes any changes to the screen, user can notice it from the screen instantly.

The examples mentioned above are the practical examples for the invention. It shall not be used as a limit to the invention. Any revisions, replacement or improvement to the spirit and principle of the invention shall be included into the protection scope of the invention.

APPLICATION EXAMPLE

Secure the internet in the office
Equipment Installation:
1) The office desk of the user is placed with a KVM extender receiving end provided with switch device.

2. Set up two sets of network system in the computer room. The first network system is internal office network system, which is completely separated from interact. The second network system is the network system that has access to the internet and that is connected to the internet.

2) There is one computer for each set of network system, which is separately connected to KVM extender transmitting end 6. KVM extender transmitting end 6 is connected to KVM extender receiving end provided with switch device through twisted-pair cables.

Use Instruction:
1) Connect display device, mouse and keyboard to KVM extender receiving end provided with switch device.

2) Based on user's demand, switch device connects the video decoder 11 of KVM extender receiving end with different extension cables. As each extension cable is connected to one KVM extender transmitting end 6 and each KVM extender transmitting end 6 is connected to one computer mainframe, users can have free access to the internet and internal office network.

What is claimed is:

1. A working method for KVM extender transmitting end, characterized in that it includes: KVM extender transmitting end receiving desktop codes from virtual terminals; said KVM extender transmitting end transferring said desktop codes into differential signals with equal length and width, said KVM extender transmitting end sending said differential signals with equal length and width to KVM extender receiving end.

* * * * *